United States Patent Office 3,445,505
Patented May 20, 1969

3,445,505
METHOD OF PREPARING A LOWER-ALKYL-β FORMYLPROPIONATE AND RELATED COMPOUNDS
Hachiro Wakamatsu and Jiro Sato, Tokyo, and Masahiko Takesada and Seiicho Sato, Kanagawa-ken, Japan, assignors to Ajinomoto Co., Inc., Tokyo, Japan
No Drawing. Continuation-in-part of application Ser. No. 410,310, Nov. 10, 1964. This application Feb. 10, 1966, Ser. No. 526,344
Claims priority, application Japan, Nov. 11, 1963, 38/60,533; Feb. 15, 1965, 40/8,195
Int. Cl. C07c 69/24, 69/66
U.S. Cl. 260—483                     2 Claims

ABSTRACT OF THE DISCLOSURE

Lower-alkyl β-formyl propionate and related compounds are prepared in high yields from gaseous acetylene, carbon monoxide, and hydrogen in the presence of a cobalt carbonyl catalyst and of a lower alkanol at 100°–160° C. when the mole ratio of carbon monoxide and acetylene is at least 4:1, the mole ratio of hydrogen to carbon monoxide is less than 2:1, more than ½ liter alkanol is available per mole acetylene, and the partial pressure of the carbon monoxide in the mixture is at least 50 kg./cm.$^2$ (reduced to 20° C.). Ethylene may be hydroformylated simultaneously when not exceeding half of the acetylene.

---

This application is a continuation-in-part of our co-pending application Ser. No. 410,310, filed on Nov. 10, 1964.

This invention relates to the preparation of lower alkyl esters of β-formylpropionic acid, of acetals of the esters, and of related compounds. The esters and actals are valuable intermediates in the synthesis of glutamic acid.

It is known that alkyl γ,γ-dialkoxybutyrate may be obtained by reaction of acetylene with carbon monoxide and hydrogen in the presence of an alcohol and a cobalt catalyst (Crowe, Chemistry and Industry, 1960, 1000; 1506–1507). The compound, which is an acetal of the corresponding β-formylpropionate, was heretofore obtained in the yields which did not amount to a conversion of even 40% of the acetylene employed, and a large percentage of the acetylene was converted to alkyl succinate for which there is a very limited use at this time.

We have found that the yield of the desired actal or of the alkyl β-formylpropionate can be sharply increased by maintaining critically important ratios of the gaseous reactants, and by keeping the pressure of the mixture of gaseous reactants above a critical minimum value. At the same time, the formation of esters of succinic acid and propionic acid is held to a minimum consistent with the high conversion rate of acetylene to the β-formylpropionate and its acetal.

More specifically, high yields of the desired product require a ratio of at least four moles of carbon monoxide per mole of acetylene in the gaseous reaction mixture, and the amount of hydrogen present must not exceed two moles per mole of carbon monoxide, but even two moles of carbon monoxide per mole of acetylene give significantly higher yields than were available heretofore. The pressure in the reaction vessel must be at least 50 kg./cm.$^2$, and the partial pressure of carbon monoxide in the reaction mixture should preferably be at least 50 kg./cm.$^2$, when reduced to 20 degrees centigrade, for highest yields. The reaction is carried out in the presence of a cobalt catalyst in itself conventional, and of at least one-half liter, and preferably one liter, of lower alkanol per mole of acetylene.

Methanol, ethanol and the several isomeric propanols and butanols may be employed in the reaction. Since the radicals of these alcohols present in the compound obtained are removed in subsequent operations for which the compound is a starting material, methanol and ethanol are preferred for reasons of economy. The alkanol used need not be entirely free from water, and small amounts of water have no significant effects on the reaction nor on the yield. The amount of the alkanol in contact with the gaseous reactants has an important bearing on the yield of the desired product and on the suppression of side reactions. At least one liter of alkanol should be available for each mole of acetylene in the reaction mixture for best results. No advantages are gained nor are disadvantages incurred by using more than thirty liters or even fifty liters of the alkanol.

The several cobalt carbonyls and other cobalt compounds which are converted to a carbonyl under the conditions of the reaction are suitable catalysts, as is known in itself. The catalyst thus may be introduced into the reaction zone in the form of dicobalt octacarbonyl, cobalt hydrocarbonyl, tetracobalt decacarbonyl, acetylene cobalt carbonyl complexes, finely divided metallic cobalt, cobalt halides and other inorganic cobalt salts, cobalt acetate and other organic cobalt salts, cobalt oxides and hydroxides. The concentration of cobalt in the liquid portion of the reaction mixture is held within the usual limits of 0.1 and 10 grams per liter, and preferably between 0.5 and 5.0 grams per liter for adequate results with economical use of the catalyst.

The yield of β-formylpropionate and of its acetal increases as the ratio of carbon monoxide to acetylene is increased beyond 4:1, whereas there is no significant increase in the formation of succinates and proprionates from acetylene until the CO:$_2$H$_2$ ratio exceeds 20:1.

Carbon monoxide and hydrogen are produced together with acetylene and ethylene on the petroleum bases. A pressure vessel containing acetylene and catalyst is charged with the mixture of carbon monoxide and hydrogen until til the pressure exceeds 50 kg./cm.$^2$. The yield increases with CO pressure, and best results are obtained above total pressures of 100 kg./cm.$^2$. Pressures of more than 1,000 kg./cm.$^2$ require reaction vessels not readily available at this time on an industrial scale, and there is some indication that the yield of the desired products decreases at pressures above 500 kg./cm.$^2$ (see Table I hereinbelow).

The reaction is preferably carried out at temperatures between 100° and 160° C., and the time required for optimal conversion of the acetylene is inversely related to the temperature under otherwise comparable conditions. A few minutes to one hour are typical reaction periods. Reaction temperatures between 120° and 140° C. give the highest yields.

The influence of several process variables on the yields of ethyl γ,γ-diethoxybutyrate (Compound I), ethyl succinate (Compound II), and ethyl propionate (Compound III) are evident from Table I. In the test runs whose results are reported in the table, ethanol containing dicobalt octacarbonyl (2 g./l. as Co) was placed into an autoclave, and the necessary amount of acetylene was admitted and dissolved in the alcohol. A mixture of hydrogen and carbon monoxide was then introduced into the autoclave, and the reaction mixture was heated to 140° C. for four minutes. The reaction product was analyzed by gas chromatography, and the yields were calculated on the basis of the acetylene originally present.

TABLE I

| | Molar Ratio | | Part. Press., kg./cm.² | | Liter EtOH per mole C₂H₂ | Yield, Percent, of Compound | | |
|---|---|---|---|---|---|---|---|---|
| | CO:C₂H₂ | H₂:C₂H₂ | CO | H₂ | | I | II | III |
| Run No.: | | | | | | | | |
| 1 | 6.2 | 3.1 | 162 | 81 | 1.19 | 40.0 | 7.6 | 13.0 |
| 2 | 8.0 | 2.0 | 250 | 62 | 1.19 | 50.0 | 7.8 | |
| 3 | 8.6 | 4.3 | 138 | 69 | 1.85 | 41.5 | 4.5 | |
| 4 | 9.6 | 4.8 | 162 | 81 | 1.85 | 45.6 | 4.7 | 13.0 |
| 5 | 10.3 | 5.1 | 375 | 187 | 1.19 | 42.1 | 2.3 | |
| 6 | 10.0 | 2.5 | 250 | 62 | 1.19 | 50.4 | 7.8 | 12.1 |
| 7 | 13.0 | 6.5 | 162 | 81 | 2.50 | 45.0 | 4.9 | |
| 8 | 17.1 | 8.6 | 625 | 312 | 1.19 | 42.6 | 2.3 | |
| 9 | 20.0 | 10.0 | 162 | 81 | 4.00 | 43.6 | 6.7 | 25.8 |
| 10 | 31.0 | 15.0 | 162 | 81 | 14.3 | 54.8 | 10.6 | 20.0 |

We have found that a further increase in the yield of the desired product under otherwise comparable conditions can be achieved by delaying contact of the reactants with the cobalt catalyst until the reaction mixture has been heated to the reaction temperature. The influence of preheating on the yields of the principal reaction products is illustrated in Table II. The procedure followed in the odd-numbered runs was as follows:

25 milliliters of a solution of dicobalt octacarbonyl in ethanol (Co concentration of 2 g./l.) were placed in a 50 ml. autoclave, and the required amount of acetylene was introduced and almost completely dissolved in the alcoholic solution. A mixture of carbon monoxide and hydrogen in a molar ratio of 2:1 was then introduced until the total pressure reached 200 kg./cm.². The contents of the autoclave were then heated to 140° C. and held at that temperature for four minutes.

In the even-numbered runs, the same autoclave was employed. The ethanol was placed in the autoclave which was then charged with the acetylene, the carbon monoxide and the hydrogen. The contents of the autoclave were heated to 140° C., and the dicobalt octacarbonyl was injected into the autoclave under pressure at that temperature. The reaction was interrupted four minutes later. Other process variables are evident from the table.

TABLE II

| | C₂H₂ mM. | EtOH/ C₂H₂ Liter/M | Molar ratio | | Yield, percent of compound | | |
|---|---|---|---|---|---|---|---|
| | | | CO:C₂H₂ | H₂:C₂H₂ | I | II | III |
| Run No.: | | | | | | | |
| 11 | 47.7 | 0.523 | 2.6 | 1.3 | 21.0 | 5.9 | 6.3 |
| 12 | 47.7 | 0.523 | 2.6 | 1.3 | 22.3 | 6.6 | 7.8 |
| 13 | 30.0 | 0.833 | 4.3 | 2.1 | 28.0 | 7.4 | 13.2 |
| 14 | 30.0 | 0.833 | 4.3 | 2.1 | 36.2 | 6.2 | 11.2 |
| 15 | 21.0 | 1.19 | 6.2 | 3.1 | 40.4 | 7.6 | 13.0 |
| 16 | 21.0 | 1.19 | 6.2 | 3.1 | 41.4 | 7.1 | 17.1 |
| 17 | 13.5 | 1.85 | 9.6 | 4.8 | 45.6 | 4.7 | 13.0 |
| 18 | 13.5 | 1.85 | 9.6 | 4.8 | 53.8 | 4.8 | 22.2 |
| 19 | 10.0 | 2.50 | 13.0 | 6.5 | 39.6 | 4.9 | |
| 20 | 10.0 | 2.50 | 13.0 | 6.5 | 52.5 | 6.7 | 17.3 |
| 21 | 6.3 | 4.00 | 20.0 | 10.0 | 43.6 | 6.7 | 25.8 |

Preferred sources of acetylene for operation on an industrial scale include the gas produced by decomposition of calcium carbide with water, or gas mixtures rich in acetylene and produced by thermal cracking of hydrocarbons such as methane, naphtha, and crude petroleum. Ethylene present in the raw gas is almost quantitatively converted to acetals of propionaldehyde in the method of the invention without affecting the yield of γ,γ-diethoxybutyrate from acetylene to a significant extent.

Higher unsaturated hydrocarbons, such as methyl acetylene, vinyl acetylene, and butadiene, contained in the cracked gas do not interfere with the reaction of acetylene or ethylene with carbon monoxide and hydrogen, but it is easier to remove these impurities from the raw cracked hydrocarbon gas than to remove the resulting by-products from the reaction product, and it is therefore prefererd to have the starting material substantially free from unsaturated hydrocarbons having more than two carbon atoms.

Methane is usually present in cracked hydrocarbon gases, and is difficult to separate from carbon monoxide and hydrogen. Methane, however, is inert under the conditions of the hydroformylation reaction of this invention, and need not be removed from the starting material if present. It does not influence the desired reaction.

When the amount of ethylene in the acetylene-bearing raw material is of the same order of magnitude as the acetylene, we prefer to adjust the proportions of other reactants to compensate for this fact. The Eastman flame-cracking process using propane yields a gaseous product containing 80 percent more ethylene than acetylene. The partial combustion of methane by the SBA-1 process or by the Sachsse process of BASF, on the other hand, results in a cracked gas in which the ratio of acetylene to ethylene is greater than 25:1.

We have found that these gases and others having acetylene-to-ethylene ratios intermediate the extremes indicated above can be employed in the process of this invention without affecting the high yields if the minimum amount of carbon monoxide and hydrogen is increased in proportion to the ethylene present.

Whereas at least two and preferably four moles of carbon monoxide should be present in the reaction mixture for each mole of acetylene in the absence of substantial amounts of ethylene, equally good results are achieved in the presence of ethylene if the amount of carbon monoxide is increased by one mole for each mole of ethylene present. Hydrogen which should be employed in molar amounts at least equal to the acetylene present when little or no ethylene is contained in the reaction mixture, should be increased by one mole for each mole of ethylene.

The reaction mixture may be worked up in a conventional manner to recover the several compounds produced. When the reaction mixture is contacted with oxygen or air, the cobalt carbonyls present are converted to cobalt salts. The cobalt salts may be recovered by passing the oxidized reaction mixture over a cation exchange resin or by precipitating cobalt in the form of its insoluble salts. The solvent may be distilled off, and the residue may be fractionated to recover the hydroformylation products separately.

It is an advantage of the invention that gases lean in acetylene and ethylene may be converted to useful compounds in the presence of large amounts of other compounds normally present in partially purified cracked hydrocarbon gases. The by-products produced, if any, are readily separated from the main product by fractionation if higher unsaturated hydrocarbons are substantially removed from the raw material.

The following examples are further illustrative of the invention, and it will be understood that the invention is not limited thereto.

EXAMPLE 1

25 milliliters of a solution of dicobalt octacarbonyl in ethanol (cobalt content 2 g./l.) was placed in a 50 ml. autoclave and 13.5 millimoles acetylene were introduced into the closed autoclave. A mixture of carbon monoxide and hydrogen in a molar ratio of 2:1 was introduced into the autoclave until the total pressure was 200 kg./cm.². The autoclave was then heated to 140° C. for four minutes and was thereafter cooled. The contents were recovered and analyzed by gas chromatography. 0.1 millimole ethyl γ,γ-diethoxybutyrate were found for a yield of 45.6 percent. The reaction mixture also contained ethyl β-formylpropionate in an amount corresponding to a yield of 4.5 percent.

The reaction mixture was fractionated, and 1.1 g. ethyl γ,γ-diethoxybutyrate were recovered from the fraction boiling at 98° to 104° C. at 10 mm. Hg.

EXAMPLE 2

25 ml. of a suspension of cobalt hydroxide in methanol containing 5% water (cobalt content 1.0 g./l.) were placed in a 100 ml. autoclave, and 2.5 millimoles acetylene were introduced into the autoclave. A mixture of carbon monoxide and hydrogen in a molar ratio of 4:1 was then forced into the autoclave until the internal pressure reached 150 kg./cm.$^2$. The contents of the autoclave were heated to 130° C. for 10 minutes. The reaction mixture was cooled and analyzed by gas chromatography.

It contained a combined total of 1.5 millimoles of methyl γ-formylpropionate and of its dimethyl acetal. The combined yield was 60.0 percent.

EXAMPLE 3

In each of five runs, 50 ml. methanol and 200 mg. dicobalt octacarbonyl were placed in an autoclave having a capacity of 100 ml. Five gas mixtures were produced by cracking the hydrocarbons indicated in the following Table III by the listed known methods. The gas mixtures contained acetylene, ethylene, hydrogen, carbon monoxide, and methane in the amounts indicated (millimoles), and were introduced into the autoclave in the respective runs. The pressure was then raised in each run to 200 kg./cm.$^2$ by forcing a synthesis gas containing equal volumes of hydrogen and carbon monoxide into the autoclave at room temperature, whereupon the autoclave was heated to 130° C. for 60 minutes with agitation. The autoclave was then cooled to ambient temperature, and the reaction mixture in the autoclave was analyzed by gas chromatography. The amounts (millimoles) of α- and β-formyl propionate or its acetal (α,β-FP), propionaldehyde and its acetal (PA), alkyl propionate (EP), and alkyl succinate (ES) found are listed in Table III.

EXAMPLE 4

The aforementioned autoclave was charged with 50 ml. ethanol, 100 mg. dicobalt octacarbonyl, and with a gas mixture consisting of 59.6 mM. acetylene, 45.2 mM. ethylene, 160 mM. hydrogen, 292 mM. carbon monoxide, and 28 mM. methane which had been produced by submersed combustion of crude oil. The autoclave was heated to 145° C. for 40 minutes. Its contents were then subjected to gas chromatography and the following compounds were found in the amounts indicated, the abbreviations being those employed in Table III:

|  | Mmoles |
|---|---|
| β-FP | 24 |
| PA | 41 |
| EP | 20 |
| ES | 5 |
| α-FP | 3 |

EXAMPLE 5

A small amount of a concentrated solution of cobalt carbonyl in ethanol containing 50 mg. Co and prepared by carbonylating cobalt hydroxide in a conventional manner and 45 ml. ethanol containing 5% water were placed in the autoclave described in Example 3. The gas described in Example 4 was introduced into the autoclave in the same amount as described in that example, and the autoclave was heated to 120° C. for 70 minutes. Its contents were found by gas chromatography to include:

|  | Mmoles |
|---|---|
| β-FP | 26 |
| PA | 38 |
| EP | 20 |
| ES | 5 |
| α-FP | 3 |

EXAMPLE 6

40 ml. of an azeotropic mixture of equal volumes of methanol and methyl propionate and 10 ml. of a suspension of cobalt hydroxide in methanol containing 100 mg. Co were placed in a 100 ml. autoclave and the cracked gas of Run No. 1 in Example 3 was introduced into the autoclave. The pressure was raised at room temperature to 300 kg./cm.$^2$ by forcing a synthesis gas of equal volumes of carbon monoxide and hydrogen into the autoclave, and the autoclave was heated to 150° C. for 30 minutes with agitation. It was then found to contain:

|  | Mmoles |
|---|---|
| β-FP | 6.2 |
| PA | 9.1 |
| EP | 6.2 |
| ES | 1.0 |
| α-FP | 0.2 |

EXAMPLE 7

50 ml. methanol containing 5% water by volume, 150 mg. cobalt carbonyl, and a gas mixture of 13.9 mM. acetylene, 11.8 mM. ethylene, 1.5 mM. methyl acetylene, 0.9 mM. vinyl acetylene, and 1.0 mM. butadiene were placed into a 100 ml. autoclave. Enough synthesis gas consisting of equal volumes of carbon monoxide and hydrogen was introduced to raise the pressure to 100 kg./cm.$^2$ whereupon the autoclave was heated to 130° C. for 60 minutes with agitation. It was then found to contain:

|  | Mmoles |
|---|---|
| β-FP | 5.7 |
| PA | 11.0 |
| EP | 4.7 |
| ES | 0.5 |
| α-FP | 0.9 |

While the invention has been described with particular reference to specific embodiments, it is to be understood that it is not limited thereto, but is to be construed broadly and restricted solely by the scope of the appended claims.

TABLE III

| Run number | | 1 | 2 | 3 | 4 | 5 |
|---|---|---|---|---|---|---|
| Hydrocarbon cracked | | Crude oil | Propane | Light Naphtha | Propane | Methane |
| Cracking method | | Submerged combustion | Regenerative furnace | Flame-cracking | Flame-cracking | Partial combustion |
| Gas, mM | $C_2H_2$ | 13.9 | 13.9 | 13.9 | 13.9 | 13.9 |
|  | $C_2H_4$ | 11.3 | 5.3 | 5.3 | 25.6 | 0.5 |
|  | $H_2$ | 40 | 78 | 35.3 | 56 | 95 |
|  | CO | 73 | 10 | 16.2 | 10 | 45 |
|  | $CH_4$ | 7 | 21 | 9.4 | 30 | 8 |
| Product, mM | β=FP | 7.2 | 7.4 | 7.5 | 6.7 | 8.0 |
|  | PA | 10.0 | 4.9 | 5.0 | 23.2 | 0.5 |
|  | EP | 5.0 | 4.5 | 4.5 | 6.2 | 4.1 |
|  | ES | 0.8 | 0.9 | 0.9 | 0.8 | 0.9 |
|  | α=FP | 0.6 | 0.6 | 0.7 | 0.5 | 0.7 |

What we claim is:

1. A method of preparing a lower alkyl β-formyl propionate and acetals thereof which comprises:
   (a) heating a mixture of acetylene, carbon monoxide, and hydrogen in the presence of a lower alkanol to a temperature of 100 to 160 degrees centigrade,
      (1) the mole ratio of said carbon monoxide to said acetylene in said mixture being at least four to one,
      (2) the mole ratio of said hydrogen to said carbon monoxide in said mixture being less than two to one,
      (3) the amount of said alkanol being more than one liter per mole of said acetylene, and
      (4) the partial pressure of said carbon monoxide in said mixture being at least 50 kilograms per square centimeter, when reduced to 20 degrees centigrade, and not substantially greater than 1000 kilograms per square centimeter; and
   (b) contacting said mixture and said alkanol with a cobalt catalyst at said temperature and said pressure.

2. A method as set forth in claim 1, wherein said gaseous reaction mixture contains ethylene and is substantially free of unsaturated hydrocarbons having more than two carbon atoms, the amount of said carbon monoxide in said mixture is at least four moles per mole of said acetylene plus one mole per mole of said ethylene, and the amount of said hydrogen is at least one mole per mole of said acetylene plus one mole per mole of said ethylene.

References Cited
UNITED STATES PATENTS 2,327,066   8/1943   Roelen _____ 260—483

OTHER REFERENCES

Crowe, Chemistry and Industry, July 30, 1960, page 1000.

LORRAINE A. WEINBERGER, *Primary Examiner.*

V. GARNER, *Assistant Examiner.*

U.S. Cl. X.R.

260—604, 485, 484